United States Patent
Krten et al.

(10) Patent No.: US 9,934,374 B2
(45) Date of Patent: Apr. 3, 2018

(54) METHOD AND APPARATUS FOR PROGRAM FLOW IN SOFTWARE OPERATION

(75) Inventors: Robert Krten, Ottawa (CA); Jonathan Emmett, Ottawa (CA); Clifford Liem, Ottawa (CA)

(73) Assignee: IRDETO B.V., Hoofddorp (NL)

( * ) Notice: Subject to any disclaimer, the term of this patent is extended or adjusted under 35 U.S.C. 154(b) by 97 days.

(21) Appl. No.: 14/377,501

(22) PCT Filed: Feb. 10, 2012

(86) PCT No.: PCT/CA2012/000134
§ 371 (c)(1),
(2), (4) Date: Jan. 7, 2015

(87) PCT Pub. No.: WO2013/116918
PCT Pub. Date: Aug. 15, 2013

(65) Prior Publication Data
US 2015/0113640 A1    Apr. 23, 2015

(51) Int. Cl.
*G06F 11/00*    (2006.01)
*G06F 21/52*    (2013.01)
(Continued)

(52) U.S. Cl.
CPC .............. *G06F 21/52* (2013.01); *G06F 21/54* (2013.01); *G06F 21/57* (2013.01)

(58) Field of Classification Search
CPC . G06F 21/57; G06F 21/14; G06F 8/70; G06F 21/71; G06F 21/50;
(Continued)

(56) References Cited

U.S. PATENT DOCUMENTS

2002/0072830 A1 * 6/2002 Hunt ................. G06F 8/443
 701/1
2004/0073898 A1 * 4/2004 Pande ................. G06F 8/44
 717/154
(Continued)

FOREIGN PATENT DOCUMENTS

CN    102246474 A    11/2011
CN    102307132 A    1/2012
(Continued)

OTHER PUBLICATIONS

Li, J. et al, "Comprehensive and Efficient Protection of Kernel Control Data", Dec. 2011 (Jan. 12, 2011).*
(Continued)

*Primary Examiner* — Farid Homayounmehr
*Assistant Examiner* — Lizbeth Torres-Diaz
(74) *Attorney, Agent, or Firm* — Rimon, P.C.; Marc Kaufman

(57) ABSTRACT

The present disclosure provides a description of a computer implemented method and system for protecting a software program from attack during runtime. The system comprises a plurality of software blocks for providing desired functions during execution of a software program and a trusted address server having a table for mapping predetermined source tokens to destination tokens. The trusted address server couples each of the plurality of software blocks for receipt of predetermined source tokens from any one of the plurality of software blocks, while returning a mapped destination token from the predetermined destination tokens to said any one of the plurality of software blocks in dependence upon the table for mapping predetermined source tokens to destination tokens.

33 Claims, 10 Drawing Sheets

(51) Int. Cl.
*G06F 21/57* (2013.01)
*G06F 21/54* (2013.01)

(58) Field of Classification Search
CPC ...... G06F 2221/033; G06F 21/54; G06F 8/65; G06F 9/322; H04L 67/34
See application file for complete search history.

(56) References Cited

U.S. PATENT DOCUMENTS

| | | | | |
|---|---|---|---|---|
| 2006/0161978 A1* | 7/2006 | Abadi | ............... | G06F 21/52 726/22 |
| 2008/0040593 A1* | 2/2008 | Kaabouch | ............... | G06F 21/52 712/244 |
| 2008/0109902 A1* | 5/2008 | Grosse | ............... | H04L 63/145 726/22 |
| 2009/0049425 A1* | 2/2009 | Liepert | ............... | G06F 21/14 717/110 |
| 2012/0284792 A1* | 11/2012 | Liem | ............... | G06F 9/4426 726/22 |
| 2013/0125090 A1* | 5/2013 | Durand | ............... | G06F 8/61 717/106 |
| 2015/0113640 A1 | 4/2015 | Krten et al. | | |
| 2016/0055333 A1* | 2/2016 | Li | ............... | G06F 21/554 726/22 |

FOREIGN PATENT DOCUMENTS

| | | | |
|---|---|---|---|
| CN | 104350504 A | 2/2015 | |
| JP | 2005174245 A * | 6/2005 | |
| WO | 2009034504 A2 | 3/2009 | |
| WO | WO 2009034504 A2 * | 3/2009 | ............ G06F 21/10 |
| WO | 2011041871 A1 | 4/2011 | |
| WO | 2012012861 A1 | 2/2012 | |
| WO | 2013/116918 A1 | 8/2013 | |

OTHER PUBLICATIONS

Birrer, B.D. et al., "Program Fragmentation as a Metamorphic Software Protection", Aug. 29, 2007 (Aug. 29, 2007).*

Extended European Search Report cited in corresponding European Application No. 12867908.0 dated Sep. 2, 2015.
P Falcarin et al.: "Exploiting code mobility for dynamic binary obfuscation", 2011 World Congress on Internet Security, Jan. 1, 2011, pp. 114-120.
Lin C et al. "Obfuscation of Executable Code to Improve Resistance to Static Disassembly", Proceedings of the 10th ACM Conference on Computer and Communications Security, Washington, DC, Oct. 27, 2003, pp. 1-10.
International Search Report in corresponding International Application No. PCT/CA2012/000134 dated Nov. 1, 2012.
Jinku Li et al., "Comprehensive and Efficient Protection of Kernel Control Data", IEEE Transactions on Information Forensics and Security, vol. 6, No. 4, pp. 1404-1417, Dec. 2011.
Bobby D. Birrer et al, "Program Fragmentation as a Metamorphic Software Protection", Proceedings of the Third International Symposium on Information Assurance and Security, IAS 2007, Manchester, United Kingdom, pp. 369-374, Aug. 2007.
Jun Xu et al., Transparent Runtime Randomization for Security, Proceedings of the 22nd International Symposium on Reliable Distributed Systems, SRDS'03, Florence, Italy, pp. 260-269, Oct. 6 to 8, 2003.
Third office action received patent application No. 201280069448.8, dated Sep. 30, 2017, 28 pages.
International Preliminary Report on Patentability dated Aug. 21, 2014 in connection with International Application No. PCT/CA2012/000134, 7 Pages.
First office action received patent application No. 201280069448.8, dated Jun. 2, 2016, 16 pages.
Second office action received patent application No. 201280069448.8, dated Feb. 3, 2017, 23 pages.
Decision on the request for further processing under Rule 135(3) EPC issued in EP patent application No. 12867908.1, dated Jul. 21, 2016, 1 page.
Noting of loss of rights pursuant to Rule 112(1) EPC EPC issued in EP patent application No. 12867908.1, dated May 2, 2016, 2 pages.
Communication pursuant to Rules 70(2) and 70a(2) EPC issued in EP patent application No. 12867908.1, dated Sep. 18, 2015, 1 page.

* cited by examiner

70

| Source Token | Target Token |
|---|---|
| SourceToken1 | TargetTokenGotoFragment2 |
| SourceToken2a | TargetTokenGotoFragment4 |
| SourceToken2b | TargetTokenGotoFragment3 |
| SourceToken3a | TargetTokenGotoFragment1 |
| SourceToken3b | TargetTokenGotoFragment6 |
| SourceToken4 | TargetTokenGotoFragment5 |
| SourceToken5 | TargetTokenGotoFragment6 |

Fig. 7

| Source Token | Target Token |
|---|---|
| SourceToken1 | TargetTokenGotoFragment2 |
| SourceToken2a | TargetTokenGotoFragment7 |
| SourceToken2b | TargetTokenGotoFragment3 |
| SourceToken3a | TargetTokenGotoFragment1 |
| SourceToken3b | TargetTokenGotoFragment6 |
| SourceToken4 | TargetTokenGotoFragment5 |
| SourceToken5 | TargetTokenGotoFragment6 |
| SourceToken7 | TargetTokenGotoFragment5 |

| Source Token | Target Token (red) | TargetToken (green) | TargetToken (blue) |
|---|---|---|---|
| SourceToken 1 | TargetTokenGotoFragment2r | TargetTokenGotoFragment2g | TargetTokenGotoFragment2b |
| SourceToken 2a | TargetTokenGotoFragment7r | TargetTokenGotoFragment7g | TargetTokenGotoFragment7b |
| SourceToken 2b | TargetTokenGotoFragment3r | TargetTokenGotoFragment3g | TargetTokenGotoFragment3b |
| SourceToken 3a | TargetTokenGotoFragment1r | TargetTokenGotoFragment1g | TargetTokenGotoFragment1b |
| SourceToken 3b | TargetTokenGotoFragment6r | TargetTokenGotoFragment6g | TargetTokenGotoFragment6b |
| SourceToken 4 | TargetTokenGotoFragment5r | TargetTokenGotoFragment5g | TargetTokenGotoFragment5b |
| SourceToken 5 | TargetTokenGotoFragment6r | TargetTokenGotoFragment6g | TargetTokenGotoFragment6b |
| SourceToken 7 | TargetTokenGotoFragment5r | TargetTokenGotoFragment5g | TargetTokenGotoFragment5b |

Fig. 10

METHOD AND APPARATUS FOR PROGRAM FLOW IN SOFTWARE OPERATION

RELATED APPLICATION DATA

This application claims priority to International Patent Application No. PCT/CA2012/000134, filed Feb. 10, 2012, the disclosure of which is hereby incorporated by reference in its entirety.

FIELD OF THE INVENTION

The present invention relates to methods and apparatuses for program flow in software operation and is particularly concerned with protecting software programs from attack during operation.

BACKGROUND OF THE INVENTION

Software programs consist of a number of code fragments (e.g. "modules", "compilation units", "classes", "functions", or "basic blocks") that each implement a certain subset as a logical unit of the overall functionality. During the execution of the software program, the code fragments are selected for execution in a particular sequence, depending on external inputs to the software application. Inputs can be generated by a number of sources (e.g., the user, the hardware, on-disk files, operating-system control, or other (remote) applications). In traditional software systems, the control flow relationship between the code fragments in a software application is static. The actual program flow from one fragment to the next is determined at run-time; however, the set of all possible transitions is deterministic and determined at build-time. This means that a program is constrained to a finite set of control paths upon its construction. In addition, it means that an identical set of inputs always results in the same activation sequence for the code fragments.

Implementation in Function Calls

In a standard procedural programming language (e.g. C, C++, Java, Fortran, etc.), functions encapsulate a module of program functionality. Modular programming practices include bounding the behaviour of a function to a logical piece of functionality with a well-defined function API (i.e. Application Programming Interface). Flow of control between functions occurs in a standard call-return stack.

```
refresh ( )
{
    init_graphics ( );
    for (i = 0; i <xsize; i++) {
        if (i <hidden_part) {
            calculate_line (i);
        } else {
            fill_line (i);
        }
    }
    plot ( ) ;
}
```

Which calls init_graphics( ), and then, depending on the line that is being operated on, calls either calculate_line( ) or fill_line( ), with reference to FIG. 1, we observe the call-return stack values during the call to init_graphics( ).

Hierarchically, we see the call graph illustrated in FIG. 2.

For the large part, the allowable call sequence is determined at build-time of the program. The variance in call sequences at run-time is fairly constrained. Variation in permitted function calls is in general characterized by:

If/then/else conditionals, which can cause variation in call-sites to be executed Switch statements/jump tables, which can cause variation in call-sites to be executed Function pointers, which can cause variation in a set of functions to be executed In each of the above cases, the allowable variation in functions that may be called is deterministic and determined at run-time. While these variations may be created broadly by the software authors, in general, good programming practices make the variations constrained to a set of testable sets.

Looking at the example, and assuming compilation by a standard C compiler (e.g., gcc), the refresh( ) function will always call init_graphics( ) as its first act. The init_graphics( ) function will always return to the instruction following the call instruction. The refresh( ) function will then enter the for( ) loop, and will call calculate_line( ) or fill_line( ), based on the value of the index variable i. It's obvious, but important to emphasize for this invention, that within that for( ) loop, the refresh( ) function will call one of those two functions, but no other. The calling pattern is fixed at runtime, and can be easily reverse-engineered by simply looking at the generated assembly language.

Implementation in Basic-Block Control-Flow

Referring to FIG. 3 there is illustrated the control flow diagram of a software application example. The diagram shows six code fragments (Fragment$_1$ through Fragment$_6$), and seven places where the control flow is directed from one fragment to another fragment (identified as $CP_1$ through $CP_7$). Each fragment has a starting address (determined at load-time) which is encoded within the program itself. In FIG. 3, Fragment$_2$ contains a conditional instruction that eventually results in the transfer of control to either Fragment$_3$ or Fragment$_4$. A simple code example for Fragment$_2$ is shown below.

```
if N< 10 then
    goto fragment3
else
    goto fragment4
```

The test on the value of N determines the transfer of control to either Fragment$_3$ or Fragment$_4$. If an attacker has access to the software code, then reverse engineering of the program is relatively straightforward. A call graph can be constructed by noting the changes in control flow. Subsequently, tampering with the program is straightforward as well; the control changes provide easy-to-modify places where the program's behaviour can be changed, e.g. diverted.

A partial mitigation of this is that instead of jumping to an address directly expressed within the code itself, the program can instead use an indirect jump:

ControlPointIndex=compute_index(N)

gotojump_table [ControlPointIndex]

The jump table contains the start addresses of a number of fragments. The code first calculates the index value into the table, based on the value of N. The result is an index value, which is then used to lookup the target address in the table.

Implementation in Threads

In some software applications, the software is actually organized as a set of cooperating "threads." A thread is a lightweight schedulable entity, with the characteristic that its use of the CPU is arbitrated by the operating system, based on the thread's priority and other scheduling considerations.

All software applications use threads, with the special case of a single-threaded program. A program can ask the operating system to start and stop threads within itself using well-defined function calls.

Any single-threaded program can be converted to be multi-threaded by judicious use of synchronization primitives. Effectively, control flow changes are converted into thread activation requests. Consider a scenario where function a( ) calls function b( ). In a single-threaded program, the call is implemented with a set of machine instructions that change the control flow from the location in a( ) where b( ) is called, to the first address of b( ). At some point, b( ) completes its processing and returns control back to where it left off in a( ). To convert this into a multi-threaded program, b( ) would be started as a thread, which would immediately block. When a( ) reached the place where it wanted to invoke b( ), it would use the services of the operating system to unblock b( ), and a( ) would then put itself to sleep, awaiting the completion of b( ). Some time later, when b( ) had completed, it would use the operating system to unblock a( ) and put itself to sleep, waiting for another request.

In this manner, both the single-threaded and the multi-threaded programs would effect the same operation (namely a( ) calling b( ), b( ) performing some processing, and finally b( ) returning control back to the place in a( ) where it was called from). However, the manner in which this operation is effected is radically different.

Existing software implementations lend themselves to varying degrees of static analysis. That is, once the attacker is able to extract the entire software load, they are able to prioritize and reverse engineer targeted components based on the functionality they wish to exploit. Because all the bindings (control flow paths) are static, and localized to where they are used, the attacker is able to significantly narrow their reverse engineering efforts.

One problem is that standard modular programming practices encourage software writers to build encapsulated sub-functionalities of their program into isolated functions (i.e. subroutines) or sets of functions. This practice leads to better logical break-down and maintainability of the code. On the other hand, this practice also leads to easier exploitation of the parts of a program. Pieces of the program may be exploited to create programs that were not intended by the author.

A related problem is that static control flow complicates the renewability or field updates of a deployed software application. In order to update a statically-bound program, either the entire program must be replaced, or a complicated patching process needs to be undertaken.

Another related problem with static control flow between fragments is the implementation of run-time diversity. Static control flow mechanisms are not well suited to changing the control flow graphs of software at runtime. This limits the updatability of the software for exploits in the field. Renewability for the purpose of enhanced security is hampered by statically built control-flow mechanisms.

A further problem is that an attacker can use "return oriented programming" to subvert the functionality of a system, without adding any additional code. In this technique, the existing program is statically analyzed, and a list is made of useful "end pieces" of the existing subroutines. Generally, an attacker can then call into the final few instructions of existing subroutines in order to make them do something that they weren't designed to do in the first place.

A further problem is the modular nature of software often allows attackers to subvert the intended behaviour of a program by executing portions of it from outside the bounds of the intended control-flow. Consider a shared library that publishes a well-defined API callable by any other application. Internally this shared library has a number of private functions which are intended only for use by the shared library itself and not by any other application. With a standard modular calling convention, even private functions in a module are callable by any other module assuming the attacker can determine the address of the function and its parameters.

Finally, in order to make it difficult to reverse engineer the application, it is desirable to entangle the control from and data flow with each other. Unfortunately, this is a difficult problem to solve manually.

Systems and methods disclosed herein provide for program flow in software operation to obviate or mitigate at least some of the aforementioned disadvantages.

SUMMARY OF THE INVENTION

An object of the present invention is to provide improved Systems and methods for program flow in software operation.

Accordingly, in one aspect the present invention provides a system, which inherently contains the ability for a very broad set of function call variations, but controls the actual allowable function interactions in an orthogonal method.

The advantages for this approach are as follows:

Function call inter-connections may be assigned at runtime.

Changes to function call inter-connections may be uploaded independently of the full program code.

The orthogonal method for controlling the allowable function call inter-connections may be protected through independent means, including encryption, data transformations, and the like.

Accordingly another aspect of the invention removes the explicit control flow information from the program, and only supplies it at runtime. The control flow "connections" are supplied through a set of data tables provided independently of the program. This means that the attacker will need to observe the actual runtime behaviour of the program before they can prioritize and reverse engineer a target. Hence an attacker will need to understand significantly more of the program before being able to mount an attack.

For renewability, i.e. updates to the program in the field, enabling renewed invocations, or hot-swapped at run-time, the runtime control flow allows the application to be "diverted" from the existing paths to certain fragments to new paths to different "renewed" fragments. To address diversity, i.e. differing program instances which foil attackers gaining information through comparisons, multiple diverse instances can be embodied in the software load, with an instance selected at runtime, even selecting different instances at arbitrary times. In addition to multiple program parts, which implement the same function with differing structure, i.e. diversity, these parts can also have slightly different function, making attacks that much harder.

Finally, to address data and control flow entanglement, runtime-selected diversions may be introduced to provide entanglement or not, as required. Entanglement is the concept of creating dependencies at otherwise independent regions of code and/or data, which increases an attacker's difficulty in separating protection techniques from the normal operation of the program.

At the highest level, the Trusted Address Server (TAS) is an entity that accepts source tokens and responds with target tokens based on a rule. The TAS may be a server, an oracle, a lookup table, a database, a function, a program, a state machine, a hardware circuit. The source token can be anything that can be input to the TAS. The target token can be anything that the TAS may provide in response to a source token and a rule. The rule can be any function of a source token and arbitrary data.

BRIEF DESCRIPTION OF THE DRAWINGS

The present invention will be further understood from the following detailed description with reference to the drawings in which:

FIG. 7 illustrates a table in the TAS in accordance with a third embodiment of the present disclosure;

FIG. 9 illustrates an updated table for the example of FIG. 8; and

FIG. 10 illustrates an example of how diversity can be implemented using the table in the TAS.

DETAILED DESCRIPTION OF THE PREFERRED EMBODIMENT

Figure 1:
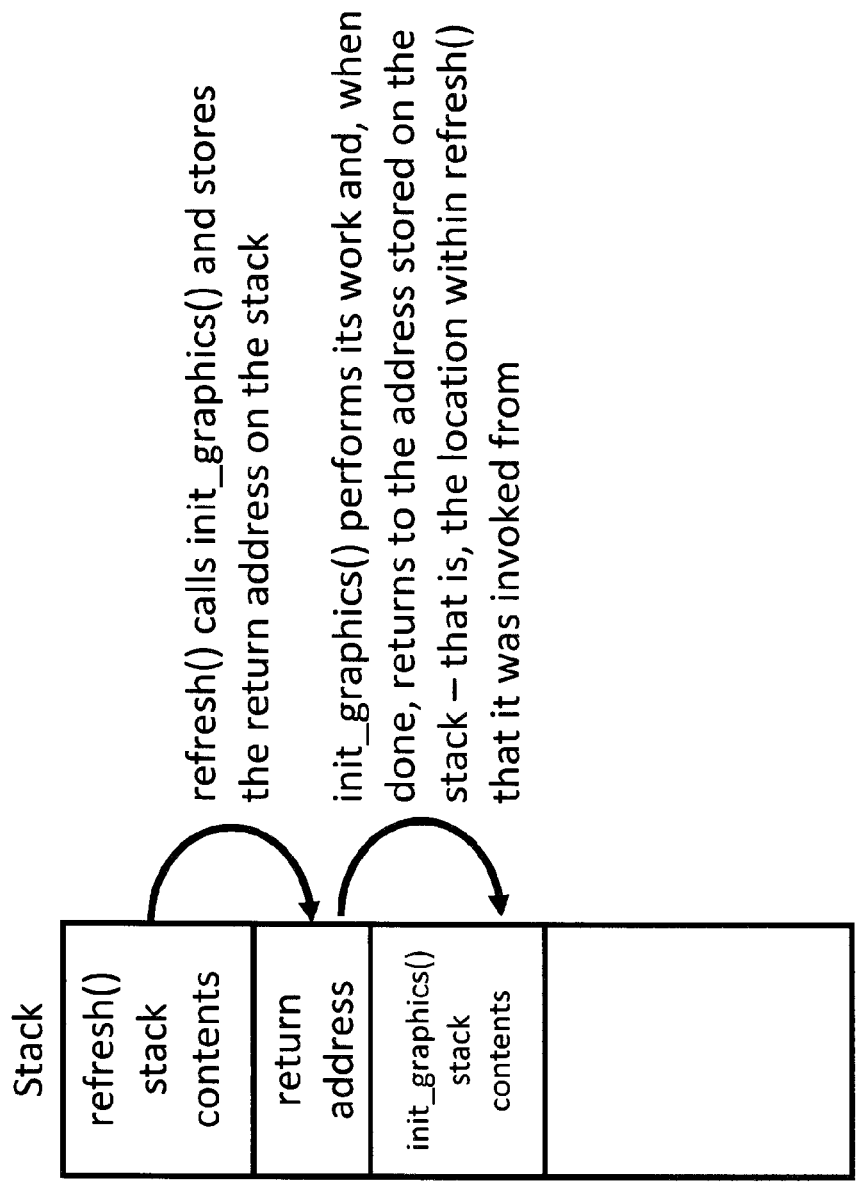
FIG. 1 illustrates a typical call return stack.
Figure 2:
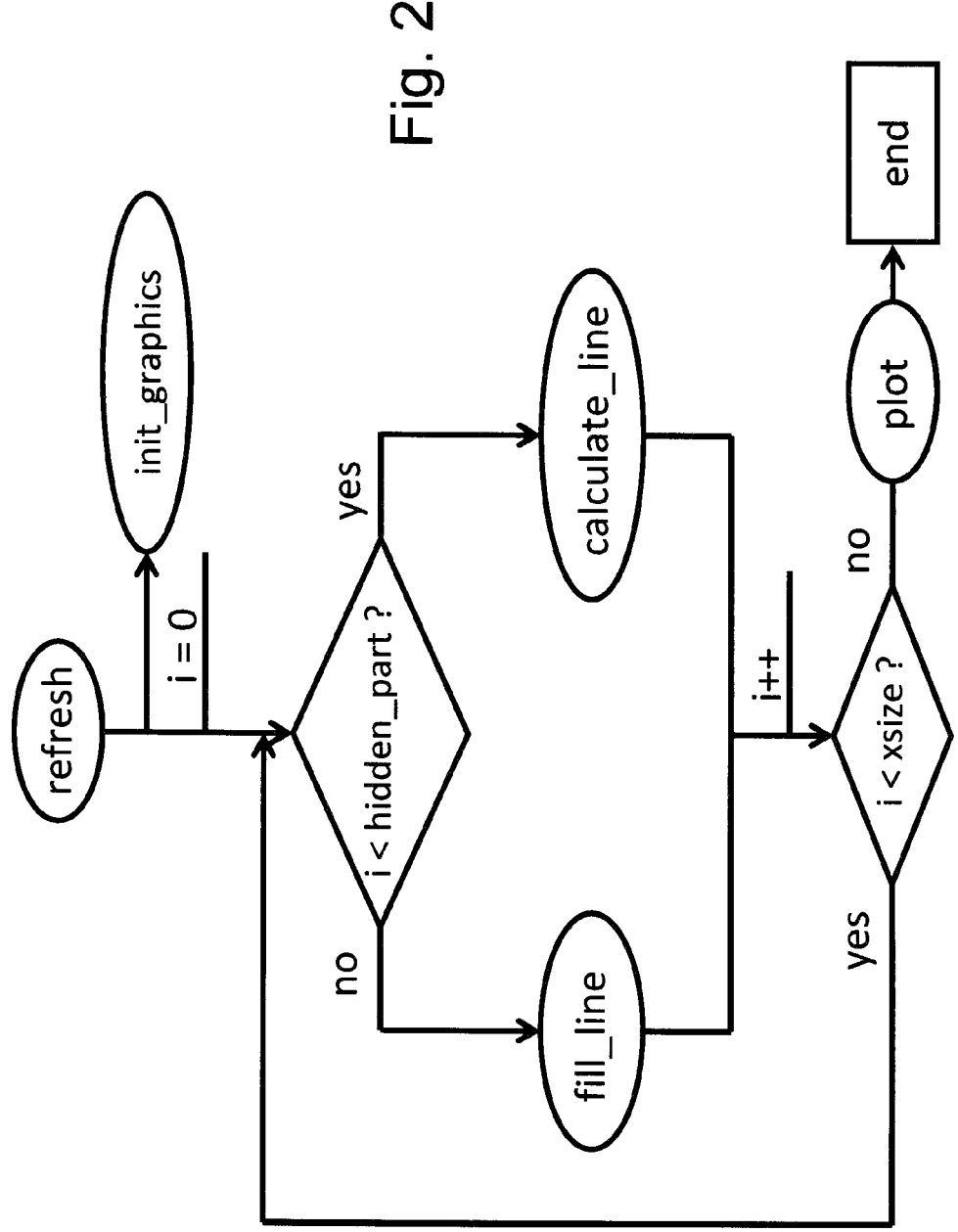
FIG. 2 illustrates a typical hierarchical call return graph.
Figure 3:
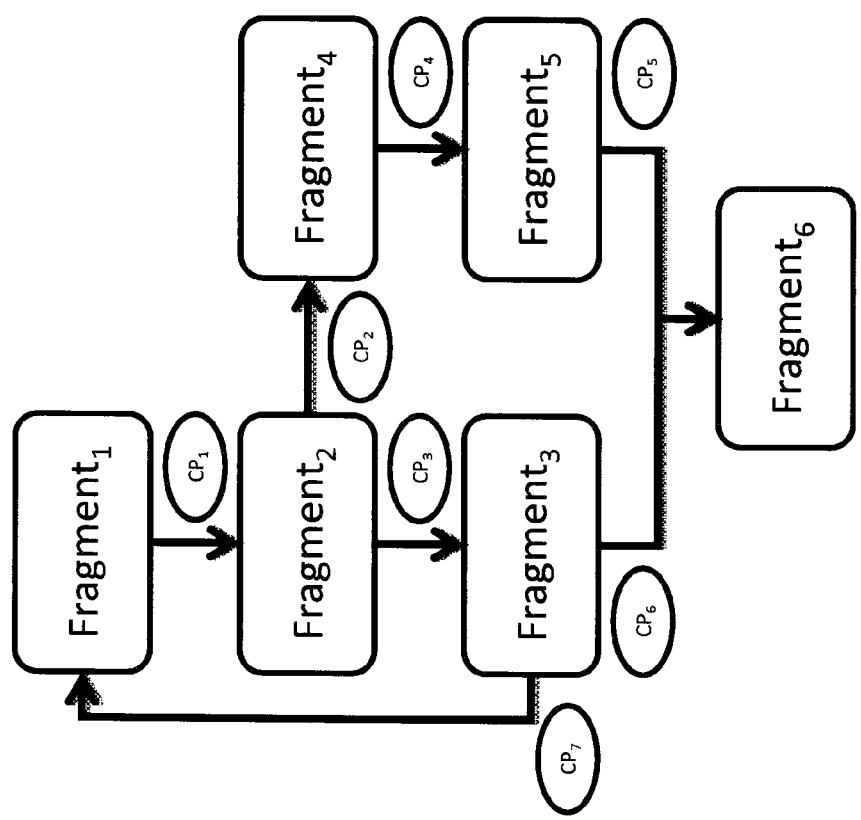
FIG. 3 illustrates typical flow control diagram of a software application example.
Figure 4:
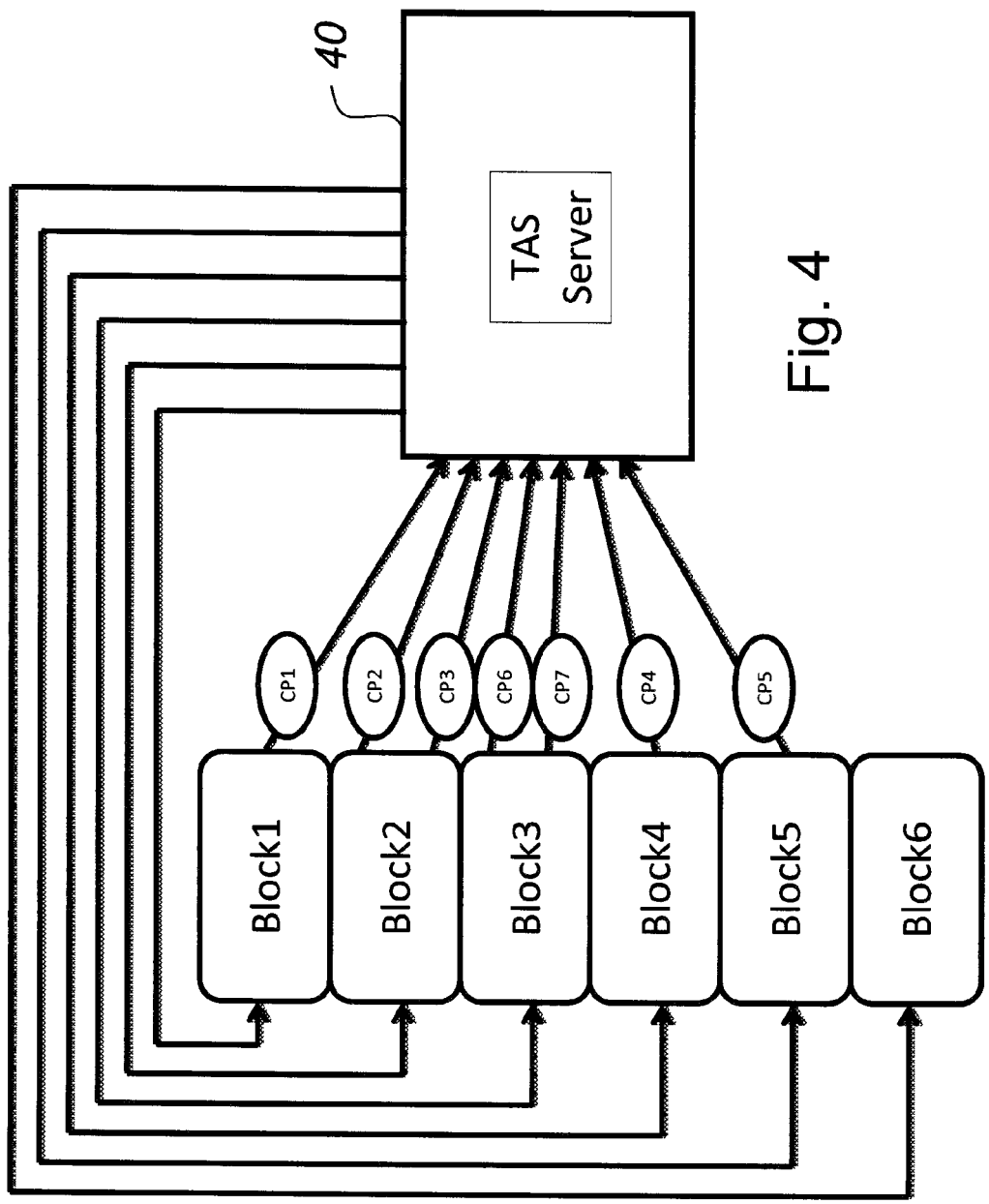
FIG. 4 illustrates flow control diagram of a software application example in accordance with a first embodiment of the present disclosure.

Referring to FIG. 4 there is illustrated a flow control diagram of a software application example in accordance with a first embodiment of the present disclosure. The system includes a trusted address server (TAS) 40 and each of the program blocks, Block1 to Block6 is coupled directly to the TAS 40.

Definitions

| | |
|---|---|
| TAS | Trusted Address Server. A functional software module that controls the program flow based on a "program" table. The TAS may reside locally or remotely. |
| Fragment | A program segment. This can be anything from a sequence of straight-line instructions to a sub-program set of modules. The size of the fragment is determined at build-time. The fragment may have control flow changes within itself; if so, those control flow changes are not specific to the TAS system; they are effectively "embedded" and are not controlled by the TAS system. |
| Source Token | An identification token provided to the TAS, used to indicate where the request to change control flow is coming from. Source tokens are generated at build-time, but may be provided to the system at run-time. An example source token is the combination of a unique number and an address, although in the spirit of the invention source tokens can be any meaningful identifier. |
| Target Token | A manifestation from TAS that effects the requested control flow change. An example of a target token is a destination address. Another example is the triggering of a rendezvous object. Target tokens are also generated at build-time, but may be provided to the system at run-time. |

FIG. 4 shows that each block calls the TAS module and sends it a Source Token. As an example, consider the following pseudo code for Block2, shown using the TAS module:

```
if N < 10 then
    goto TAS( SourceToken2a )
else
    goto TAS( SourceToken2b )
```

In the above example, the TAS module contains a table that maps source tokens to destination tokens. The mapping need not be static (that is, it can change at runtime based upon uploaded data).

The TAS module 40 uses the source token provided by the calling block (either SourceToken2a or SourceToken2b, in the example above), and performs a table lookup in order to determine an appropriate target token.

The target token can take an arbitrary form; for this example, assume that the target token represents an address. In this case, Block2, as a result of calling the TAS module, now has the address of the next block to which it should transfer control. In our example, this would be the address of CP2 or CP3, depending on which source token was passed to TAS.

The Trusted Address Server (TAS) model is a base framework forming a fundamental technology, which contains the possibility for variations that can serve different end purposes.

Examining this from an attacker's perspective, the code that is statically available merely shows that every block calls one module only, namely the TAS module 40 and then performs an indirect jump through the return value provided by the TAS module 40. The actual control flow graph that the software follows is not available by static analysis, except in the implementation of the source to target token table. We propose the use of other methods to protect the token table, including data encodings and encryption, as described in U.S. Pat. No. 6,594,761 and U.S. Pat. No. 6,842,862.

Additional security measures may include the binding of tokens to properties of the program. Consider a target token that is not associated statically with the code of the block, but rather is generated through a unique property of the code. For example, the target token can be generated at the end of the execution of a block by a unique mathematical function combined with a hash function (e.g. SHA-1, SHA-256, CRC32) of the instructions that make-up the function.

Additional security measures may involve signing the token table and verifying that the table has not been tampered with during the execution of the TAS module 40. The table is statically known at program build time and need not change during the execution of the program except under an "update" operation where the control-flow of the program is modified through an update/patch. Such an operation would necessarily provide an updated signature for the new control-flow table.

Note that in this example, the calls to target functions are replaced with indirect jumps, not calls, to the address returned by the TAS module 40. The "returns" from functions are similarly handled by replacing them with an indirect jump to the value returned by a call to the TAS module 40. In a traditional calling convention, the return address is simply stored on the stack, and any fragment can return to any arbitrary address so long as that address is stored in the appropriate location on the stack. In a program involving a TAS module, return values are not stored on the stack in the same manner. Instead, the source token is stored on the stack, and used by the TAS module to look up the address to return to. By encoding all possible call-sites and return-sites in a table, and removing the traditional calling convention of the program, we introduce a form of caller and callee authentication to the program: Individual blocks cannot return to arbitrary locations as they could in a traditional calling convention. Only return addresses encoded in the table are allowed.

Therefore, TAS enforces caller and callee authentication by replacing the traditional calling convention of the program. Internal functions that are intended for use only by the protected module itself are only called through invocations of the TAS module and do not use the ordinary return mechanism to return to the caller by jumping to the return address on the stack. These private functions can only be called from a finite set of known calling functions as only these functions have the necessary return addresses encoded in the TAS table. Should the attacker discover the actual address of the target function, they still cannot successfully call it without modifying the block itself to use the normal function-return mechanism, consequently breaking all authentic calls to this function that called through TAS and do not have a return value on the stack; or by modifying the TAS table to inject a new entry corresponding to that call. Both of these attacks involve modifications to the program that are detectable via code/table signing.

In a simple example where the target tokens are simply target addresses, an attacker can easily perform on-the-fly rewriting of a program by intercepting each call to the TAS module and recording the returned address. They may then replace the call to the TAS module with a call to this returned address. In this manner, calls to the TAS module are gradually replaced with traditional control-flow constructs and the original program with static control flow reconstructed.

One mitigation for this TAS module removal attack is to perform dynamic reordering of the table and program layout at run-time. Calls into the TAS module may then return distinct target tokens for each call, and by reordering the target modules in memory, cached addresses of target modules will not point to the correct target. This reordering can be performed by the TAS module itself.

Another mitigation is to ensure the TAS module itself is called by having the TAS module act as a translation layer between the caller and the callee, for example, reordering parameters or re-coding the transformations on the parameters or return values. In this way the attacker is forced to perform the same modifications on the parameters and return values in order to make direct calls to the target addresses, bypassing the TAS module.

Another mitigation is to embed additional control-flow knowledge into the TAS module, for example, by constructing a domination graph of fragments, and having dominator fragments perform some necessary task for the dominated fragment to execute correctly. A trivial example is to have the entries for the dominated fragment encoded in some manner that is only decoded by the dominator. Calls to the dominated fragment that did not first pass a TAS-invocation call for the dominator fragment will fail to execute correctly.

Another attack on the token table would involve the attacker introducing their own mappings from attacker-defined source tokens to the desired target address and return address appropriate for their rogue or modified application. This is mitigated through both the application of transforms to the table data and through verifying the signature of the table.

Embodiment Using Rendezvous Objects

Figure 5:
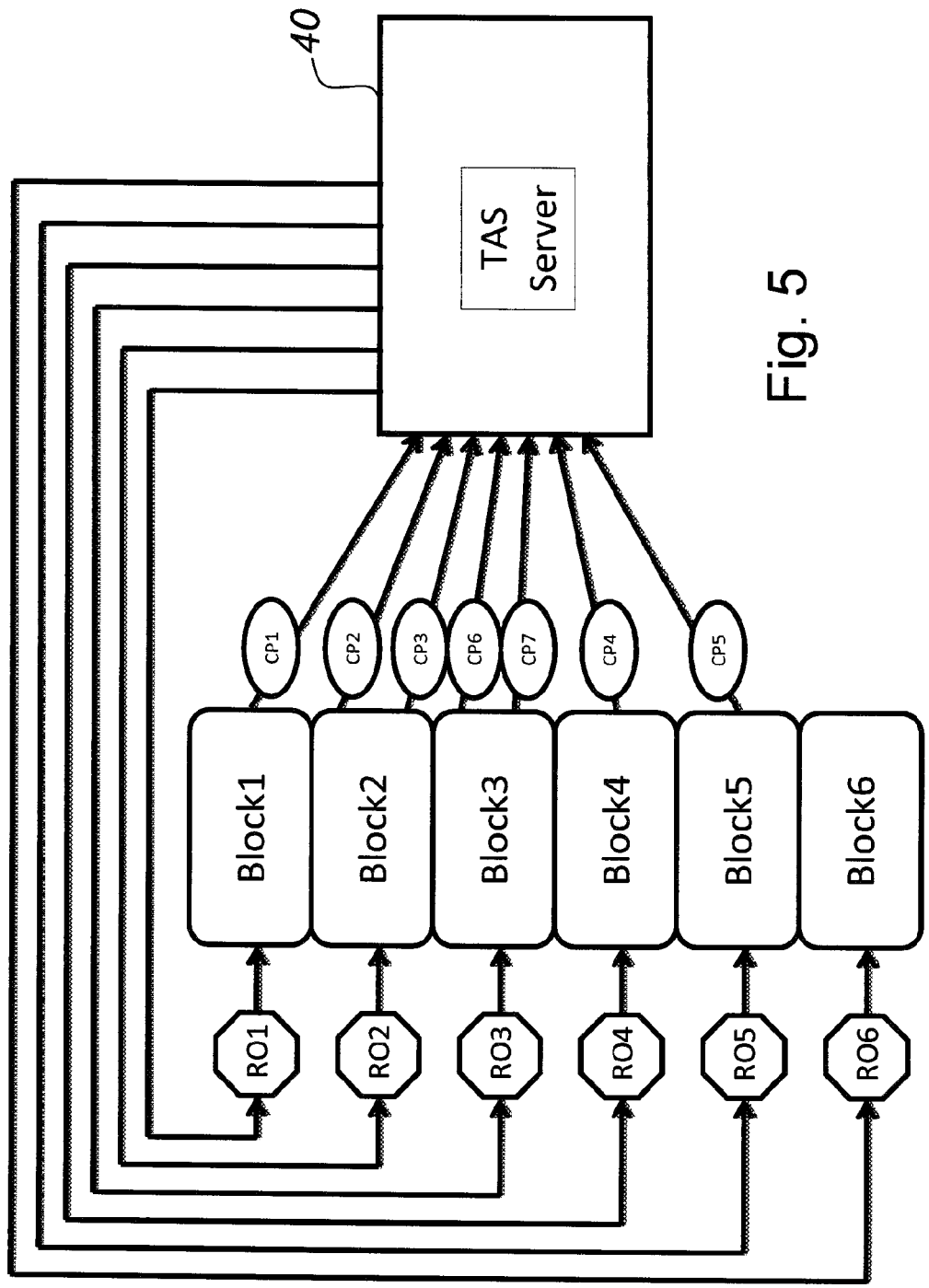
FIG. 5 illustrates flow control diagram of a software application example in accordance with a second embodiment of the present disclosure.

In another embodiment of the invention, the fragments are triggered due to a scheduling operation rather than a direct control flow change. The net effect is the same—a different fragment executes, but the manner in which it happens is much more obscure:

In this embodiment of the invention, each fragment is implemented as a thread (q.v. POSIX "pthread"). The fragment waits on a Rendezvous Object (RO1 through RO6 in FIG. 5), for example a condition variable. When a fragment needs to pass control to another fragment, it passes a source token to TAS, which then uses the thread signaling mechanism (e.g., signals a condition variable) to cause a fragment to be scheduled. In this manner, the scheduling mechanism is used to implement the change of control flow operation, rather than a "jump" or "call" function. The "target token," in this case, is the activation of a certain rendezvous object.

Renewability and Diversification

By varying the association between the source token and the target token, TAS can implement renewability and diversification. Technically, renewability is a subset of diversification. That is, a new target token is selected for all future mappings of a given source token, until another "renewal" is performed.

Figure 6:
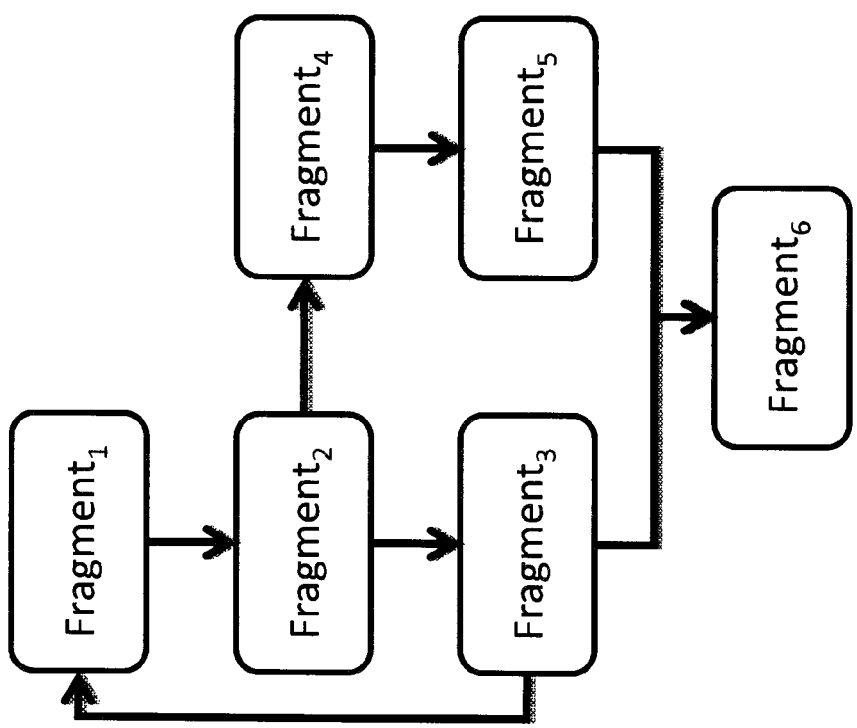
FIG. 6 illustrates flow control diagram of a software application example to be implemented in accordance with a third embodiment of the present disclosure.

Referring to FIG. 6 there is illustrated an example how renewal of a program might affect the flow control diagram. Let us assume that the control graph of FIG. 6 is implemented by TAS using the mapping provided in the table 70 given in FIG. 7. That is to say that, for example, Fragment2 sends one of two source tokens, SourceToken2a and SourceToken2b to TAS, and receives a target token that effects the control transfer to either Fragment3 or Fragment4.

Figure 8:
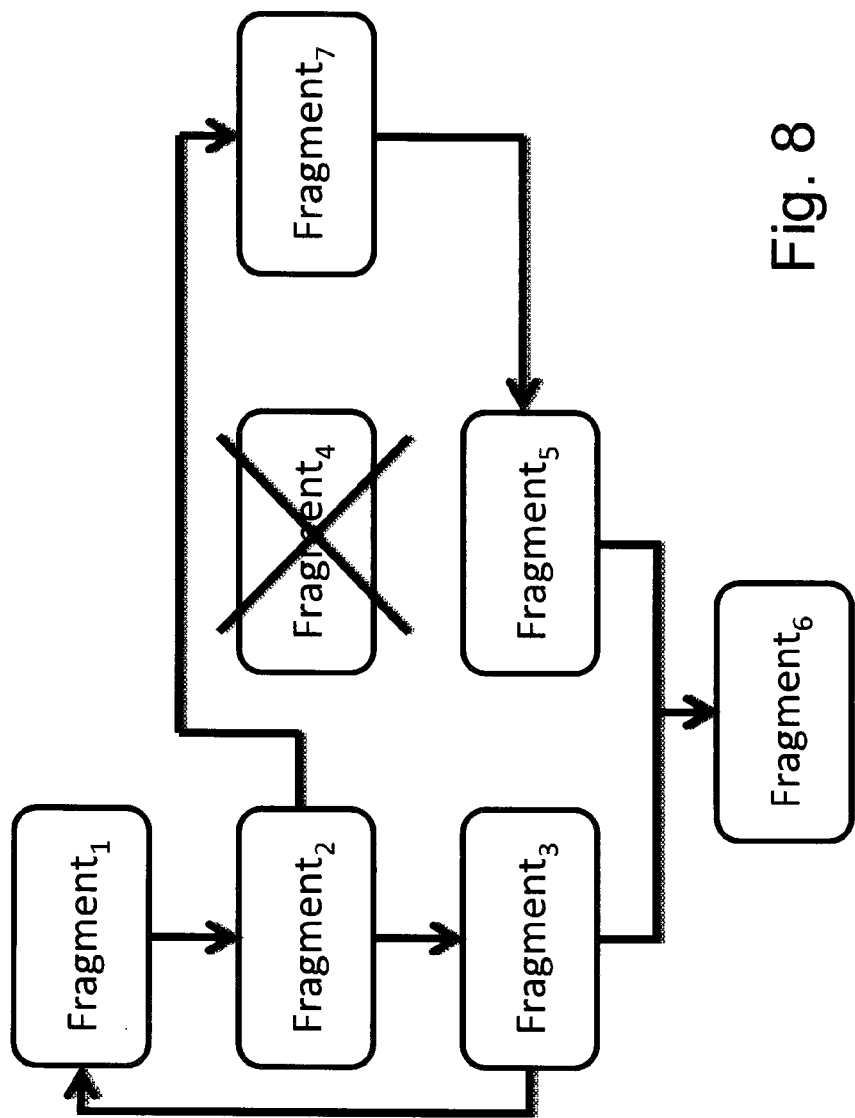
FIG. 8 illustrates an example how renewal of a program might affect the flow control diagram.

Referring to FIG. 9, there is illustrated an updated table for the example of FIG. 8. The TAS's internal table by way of example, would look like table 90 of FIG. 9.

For renewability, let us further assume that Fragment4 is now replaced by a new fragment, Fragment7. In order to update the software, the only change required, apart from the addition of Fragment7 itself, is for TAS to update its source/target token map. In this case, the mapping between SourceToken2a and the destination token corresponding to the control flow change would remove Fragment4 to have a different destination token that transfers control to Fragment7 instead. Thus, once Fragment7 has been incorporated into the program, a simple TAS table update effects the change in flow control illustrated in FIG. 8.

Diversity, that is, the ability to select a different instance of a fragment at runtime. Diversity can be easily effected by using a TAS. In the present example illustrated in FIG. 10, the only change required is that TAS maintains multiple mappings from each source token. The actual target token selected depends upon which instance of diversification is running. If we consider three diverse instances, called red, green, and blue, the TAS control table would look table 100 in FIG. 10.

The TAS module then selects the diversification "colour" and proceeds to serve target tokens from the appropriate column 102, 104 or 106, in its internal table.

Diversification is but one application of the above technology. It can also be applied to customize the software based on any number of factors. For example, the user has purchased an upgrade, or has proceeded to a new level in a game, or a certain date has passed. The advantage in this case is that the software load itself does not need to change; only the "which column to use" selection is changed within TAS.

As a further subset of diversification functionality, the selection of target tokens can be based on arbitrary state within TAS or external to TAS. For example, in order to implement forced entanglement of code and data, such as that provided by integrity verification, a number of TAS calls can be automatically "sprinkled" throughout the application code. For the most part, these calls will result in target tokens that are effectively "no-ops"—they do nothing other than cause the flow of execution to proceed as if the call had not taken place. However, based on an internal TAS state variable (or by any arbitrary combination of external triggers, for example, the number of times a particular source token has been received by TAS, or the pattern of source tokens received by TAS, etc.), the target token can be converted into an active call (such as the aforementioned integrity verification call).

Alternatively, the TAS module can be accessed via a network, preventing the attacker from obtaining the address from the device where the software application resides. During execution, the attacker is forced to capture the TAS request and store the result from the TAS module. In order to make the attacker's capturing of the data less useful, the fragment and the TAS can use a common mechanism to randomise both the source token and the returned target token (e.g., scrambling via linear feedback shift register, encryption, etc.)

In yet another variant, the TAS server is complemented by a local TAS proxy that implements the TAS functions locally for a certain subset of source tokens. This TAS proxy reduces the amount of interaction with an external TAS. Effectively, the local TAS acts as a "cache server" for the remote TAS. The TAS proxy may need to call the TAS to resolve the source tokens that are outside the subset, or that have expired (thus implementing dynamic updates). There may be multiple local TAS proxies in arbitrary hierarchical structures.

In yet another variant, TAS is completely local to the target device. Security of the TAS implementation is achieved through code and table obfuscation and signing, or by having TAS located in the operating system's kernel (assuming the kernel is protected).

In an independent variant, TAS prevents "return oriented programming" by changing the logical end of existing procedures into a TAS server call. In this manner, an attacker cannot subvert existing code (without change) because the function no longer returns to the caller, but rather returns by way of TAS. Since TAS keeps track of the state of the application, it can take appropriate action when it sees an unexpected return request.

APPLICATIONS FOR THE INVENTION

This technology is an underlying "base" technology, and can be applied in numerous places:
1) A basic obfuscation service that makes it difficult to successfully reverse engineer software
2) A software update method that makes it easy to provide updates
3) A runtime software diversification method
4) A method to perform on-demand entanglement of verification (and other operations)

Numerous modifications, variations and adaptations may be made to the particular embodiments described above without departing from the scope patent disclosure, which is defined in the claims.

What is claimed is:

1. A computer implemented method executed by one or more computing devices for determining the flow of control of a software program during runtime, the software program including a plurality of software blocks that each implement a subset of the overall functionality of the software program, the method comprising: receiving, by an address server, one or more source tokens from a current one of the plurality of software blocks controlling the software program during execution of the software program, wherein the plurality of software blocks are organized into a plurality of domains, wherein each domain comprises a diverse instance of the software program, and wherein each diverse instance of each software block is configured to implement the same function as other diverse instances of that software block having different structures; selecting, by the address server, a domain in the plurality of domains; identifying one or more destination tokens corresponding to the one or more received source tokens based at least in part on the selected domain and a table for mapping source tokens to destination tokens corresponding to the plurality of domains, the one or more destination tokens indicating a next block of the plurality of software blocks to which the current one of the plurality of software blocks should transfer control of the software program; and transmitting the one or more destination tokens to the current one of the plurality of software blocks, to thereby direct the current one of the plurality of software blocks to transfer control of the software program to the next block of the plurality of software blocks, and to thereby protect the software program form attack during runtime.

2. The method of claim 1, wherein the one or more source tokens comprise an arbitrary identifier including at least one of a number, a memory address, a current program counter value, a value of a register, contents of a memory address or contents of an arbitrary storage medium location.

3. The method of claim 1, wherein the one or more destination tokens comprise at least one of an arbitrary identifier or action including at least one of a number, a memory address, a call to a function, a return from a block or a message sent on a communications medium.

4. The method of claim 1, wherein the one or more source tokens comprise a memory address.

5. The method of claim 1, wherein the one or more destination target tokens comprise a memory address.

6. The method of claim 1, wherein the one or more one or more destination tokens corresponding to the one or more received source tokens are identified based at least in part on the selected domain, the table mapping each source token in the one or more tokens to a plurality of destination tokens, and an internal state variable of the address server.

7. The method of claim 1, wherein the address server is located within at least one of an address space of the software program requesting mapping, a separate program on the same computer, a separate program on the same computer in a secure location, and a separate program on a remote device coupled via a communications protocol.

8. The method of claim 1, wherein the address server comprises a remote address server and one or more proxy address servers configured to identify destination tokens for a subset of the one or more source tokens.

9. The method of claim 8, wherein the remote address server is configured to supply at least one source token to destination token mapping to at least one of the one or more proxy address servers.

10. The method of claim 1, further comprising: updating the table to cause an original one of the plurality of software blocks to be bypassed and its functionality to be replaced by a different software block without changing the code in the original one of the plurality of software blocks.

11. The method of claim 1, wherein the address server is configured to make one of the plurality of domains active without changing any of the code in the software program.

12. An apparatus for determining the flow of control of a software program from attack during runtime, the software program including a plurality of software blocks that each implement a subset of the overall functionality of the software program, the apparatus comprising: one or more processors; and one or more memories operatively coupled to at least one of the one or more processors and having instructions stored thereon that, when executed by at least one of the one or more processors, cause at least one of the one or more processors to: receive, by an address server, one or more source tokens from a current one of the plurality of software blocks controlling the software program during execution of the software program, wherein the plurality of software blocks are organized into a plurality of domains, wherein each domain comprises a diverse instance of the software program, and wherein each diverse instance of each software block is configured to implement the same function as other diverse instances of that software block having different structures; select, by the address server, a domain in the plurality of domains; identify one or more destination tokens corresponding to the one or more received source tokens based at least in part on the selected domain and a table mapping each source token in the one or more source tokens to a plurality of destination tokens corresponding to the plurality of domains, the one or more destination tokens indicating a next block of the plurality of software blocks to which the current one of the plurality of software blocks should transfer control of the software program; and transmit the one or more destination tokens to said the current one of the plurality of software blocks, to thereby direct the current one of the plurality of software blocks to transfer control of the software program to the next block of the plurality of software blocks, and to thereby protect the software program form attack during runtime.

13. The apparatus of claim 12, wherein the one or more source tokens comprise an arbitrary identifier including at least one of a number, a memory address, a current program counter value, a value of a register, contents of a memory address or contents of an arbitrary storage medium location.

14. The apparatus of claim 12, wherein the one or more destination tokens comprise at least one of an arbitrary identifier or action including at least one of a number, a memory address, a call to a function, a return from a block or a message sent on a communications medium.

15. The apparatus of claim 12, wherein the one or more source tokens comprise a memory address.

16. The apparatus of claim 12, wherein the one or more destination tokens comprise a memory address.

17. The apparatus of claim 12, wherein the one or more one or more destination tokens corresponding to the one or more received source tokens are identified based at least in part on the selected domain, the table mapping each source token in the one or more tokens to a plurality of destination tokens, and an internal state variable of the address server.

18. The apparatus of claim 12, wherein the address server is located within at least one of an address space of the software program requesting mapping, a separate program on the same computer, a separate program on the same computer in a secure location, and a separate program on a remote device coupled via a communications protocol.

19. The apparatus of claim 12, wherein the address server comprises a remote address server and one or more proxy address servers configured to identify destination tokens for a subset of the one or more source tokens.

20. The apparatus of claim 19, wherein the remote address server is configured to supply at least one source token to destination token mapping to at least one of the one or more proxy address servers.

21. The apparatus of claim 12, wherein at least one of the one or more memories has further instructions stored thereon that, when executed by at least one of the one or more processors, cause at least one of the one or more processors to: update the table to cause an original one of the plurality of software blocks to be bypassed and its functionality to be replaced by a different software block without changing the code in the original one of the plurality of software blocks.

22. The apparatus of claim 12, wherein the address server is configured to make one of the plurality of domains active without changing any of the code in the software program.

23. At least one non-transitory computer-readable medium storing computer-readable instructions that, when executed by one or more computing devices, cause at least one of the one or more computing devices to: receive, by an address server, one or more source tokens from a current one of the plurality of software blocks controlling the software program during execution of a software program, the software program including a plurality of software blocks that each implement a subset of the overall functionality of the software program, wherein the plurality of software blocks are organized into a plurality of domains, wherein each domain comprises a diverse instance of the software program, and wherein each diverse instance of each software block is configured to implement the same function as other diverse instances of that software block having different structures; select, by the address server, a domain in the plurality of domains; identify one or more destination tokens corresponding to the one or more received source tokens based at least in part on the selected domain and a table mapping each source token in the one or more source tokens to a plurality of destination tokens corresponding to the plurality of domains, the one or more destination tokens indicating a next block of the plurality of software blocks to which the current one of the plurality of software blocks should transfer control of the software program; and transmit the one or more destination tokens to said the current one of the plurality of software blocks, to thereby direct the current one of the plurality of software blocks to transfer control of the software program to the next block of the plurality of software blocks, and to thereby protect the software program form attack during runtime.

24. The at least one non-transitory computer-readable medium of claim 23, wherein the one or more source tokens comprise an arbitrary identifier including at least one of a number, a memory address, a current program counter value, a value of a register, contents of a memory address or contents of an arbitrary storage medium location.

25. The at least one non-transitory computer-readable medium of claim 23, wherein the one or more destination tokens comprise at least one of an arbitrary identifier or action including at least one of a number, a memory address, a call to a function, a return from a block or a message sent on a communications medium.

26. The at least one non-transitory computer-readable medium of claim 23, wherein the one or more source tokens comprise a memory address.

27. The at least one non-transitory computer-readable medium of claim 23, wherein the one or more destination tokens comprise a memory address.

28. The at least one non-transitory computer-readable medium of claim 23, wherein the one or more one or more destination tokens corresponding to the one or more received source tokens are identified based at least in part on the selected domain, the table mapping each source token in the one or more tokens to a plurality of destination tokens, and an internal state variable of the address server.

29. The at least one non-transitory computer-readable medium of claim 23, wherein the address server is located within at least one of an address space of the software program requesting mapping, a separate program on the same computer, a separate program on the same computer in a secure location, and a separate program on a remote device coupled via a communications protocol.

30. The at least one non-transitory computer-readable medium of claim 23, wherein the address server comprises a remote address server and one or more proxy address servers configured to identify destination tokens for a subset of the one or more source tokens.

31. The at least one non-transitory computer-readable medium of claim 30, wherein the remote address server is configured to supply at least one source token to destination token mapping to at least one of the one or more proxy address servers.

32. The at least one non-transitory computer-readable medium of claim 23, further storing computer-readable instructions that, when executed by at least one of the one or more computing devices, cause at least one of the one or more computing devices to: update the table to cause an original one of the plurality of software blocks to be bypassed and its functionality to be replaced by a different software block without changing the code in the original one of the plurality of software blocks.

33. The at least one non-transitory computer-readable medium of claim 23, wherein the address server is configured to make one of the plurality of domains active without changing any of the code in the software program.

* * * * *